(12) United States Patent
Picard et al.

(10) Patent No.: US 9,547,572 B2
(45) Date of Patent: Jan. 17, 2017

(54) PREDICTIVE MAINTENANCE METHOD FOR A COOLED DETECTION MODULE, AND RELATED MODULE

(75) Inventors: Aubry Picard, Paris (FR); Thomas Tillard, Paris (FR)

(73) Assignee: SAGEM DEFENSE SECURITE, Paris (FR)

(*) Notice: Subject to any disclaimer, the term of this patent is extended or adjusted under 35 U.S.C. 154(b) by 760 days.

(21) Appl. No.: 13/880,040

(22) PCT Filed: Oct. 18, 2011

(86) PCT No.: PCT/EP2011/068173
§ 371 (c)(1),
(2), (4) Date: Apr. 17, 2013

(87) PCT Pub. No.: WO2012/052426
PCT Pub. Date: Apr. 26, 2012

(65) Prior Publication Data
US 2013/0218523 A1 Aug. 22, 2013

(30) Foreign Application Priority Data
Oct. 18, 2010 (FR) .................................... 10 58477

(51) Int. Cl.
| G06K 9/36 | (2006.01) |
| G06F 11/30 | (2006.01) |
| F25B 49/00 | (2006.01) |
| F25D 19/00 | (2006.01) |
| G01J 5/06 | (2006.01) |
| G01J 5/02 | (2006.01) |
| G01J 5/04 | (2006.01) |

(52) U.S. Cl.
CPC ............ *G06F 11/30* (2013.01); *F25B 49/005* (2013.01); *F25D 19/00* (2013.01); *G01J 5/061* (2013.01); *F25B 2700/151* (2013.01); *G01J 5/026* (2013.01); *G01J 5/045* (2013.01)

(58) Field of Classification Search
USPC ............................ 361/22; 348/246; 702/184
See application file for complete search history.

(56) References Cited

U.S. PATENT DOCUMENTS

| 6,758,051 B2 * | 7/2004 | Jayanth .................. B25J 9/1687 361/22 |
| 2008/0117318 A1 * | 5/2008 | Aoki ...................... H04N 5/367 348/246 |

FOREIGN PATENT DOCUMENTS

| JP | 62030924 | 2/1987 |
| WO | WO 2009/130136 | 10/2009 |

* cited by examiner

*Primary Examiner* — Lam Nguyen
(74) *Attorney, Agent, or Firm* — Blakely Sokoloff Taylor & Zafman LLP

(57) ABSTRACT

The invention relates to a predictive maintenance method for a cooled detection module, comprising: a detector (1) comprising a matrix consisting of pixels that are sensitive to light signals; a cryostat (2) containing the detector (1); and a cooling machine (3), said method being characterized in that it comprises a step according to which a processing board (4) of the module, which is electrically connected to the detector (1), to the cryostat (2), and to the cooling machine (3) measures, stores, and processes at least: one motor current, i.e. a supply current of the machine (3); one motor voltage, i.e. a supply voltage of the machine (3); and a number of defective pixels of the detector (1). The invention further relates to a module for implementing the invention.

9 Claims, 2 Drawing Sheets

PREDICTIVE MAINTENANCE METHOD FOR A COOLED DETECTION MODULE, AND RELATED MODULE

GENERAL FIELD OF THE INVENTION

The present invention relates to a predictive maintenance method for a cooled detection module, comprising a detector comprising pixels that are sensitive to light signals, a cryostat, containing the detector, and a cooling machine.

It also relates to a module for implementing the method.

STATE OF THE RELATED ART

Known optronic systems operating in the infrared (IR) range frequently comprise so-called cooled detection modules (DM), i.e. wherein the detector is cooled to a very low temperature (−170° C.). The performances obtained are superior to those of non-cooled DMs.

Conventionally, a cooled IR DM comprises:
- an IR detector, sensitive to IR light signals;
- a cryostat, containing the IR detector and used for mechanically conditioning the detector and providing thermal insulation, so as to limit the energy consumption of the cooled DM; and
- an electro-mechanical cooling machine (CM), used to reduce the cryostat temperature locally, by means of repeated gas expansions.

The operation of a DM includes two parts:
- a first cooling mode (MeF), i.e. a transient mode for cooling an area supporting the detector to change from ambient temperature to the operational temperature thereof; and
- a second regulation mode (Reg), i.e. a stabilised mode during which the CM compensates for the imperfect thermal insulation of the cryostat encapsulating the detector.

Such a DM comprises movable elements intrinsically limiting the service life of the equipment. Sources of DM incidents are associated with the detector, cryostat and CM, but essentially with the CM and the cryostat. Indeed, the cooling phase is a critical period for the CM, since the constituents of the CM are subject to intensive use.

In this way, preventive maintenance is conventionally implemented on the DM.

Moreover, predicting specific CM faults has previously been the subject of publications, namely in FR 2 930 677 and FR 2 930 678.

FR 2 930 677 and FR 2 930 678 disclose the principle of detecting a CM fault by
- observing the Cooling Time (CT) of the CM, during cooling, over a specific temperature range, and
- observing the progression of the CT as a function of the number of On/Off cycles considered to be valid, and selected according to the type of cooling.

Furthermore, FR 2 930 677 and FR 2 930 678 disclose the above-mentioned observations on cumulative data over time.

Moreover, the teaching of FR 2 930 678 relates to maintenance prediction in terms of the number of On/Off cycles, whereas the teaching of FR 2 930 677 relates to detecting a sudden deviation in relation to the standard deviation of the previous cooling times.

However, the above techniques involve drawbacks.

DM preventive maintenance ensures that the user of the DM can avoid failures associated with ageing of the DM, but does not account for the actual condition of the DM.

Likewise, it does not enable optimisation of preventive maintenance, since it does not account for the operating mode of the CM. Indeed, the operating time of a DM, generally expressed in a number of hours of operation, remains statistical and is not suitable for accounting for disparities in production and/or use. For this reason, it is not possible for the user to maximise the benefit from the durability of the DM within the scope of standardised use. Similarly, in the event of a sudden fault in DM performance (i.e. before running maintenance), the user can merely observe the DM fault.

Moreover, the techniques according to FR 2 930 677 and FR 2 930 678 are not suitable for detecting a fault wherein the CM is degraded such as following continuous operation for a long period of time. Likewise, they are not suitable for distinguishing between the need for a preventive maintenance procedure (such as pumping up the CM—i.e. injecting gas into the CM, to compensate for the losses thereof due to leakages, or such as gettering the cryostat—i.e. regenerating the gas trap (also referred to as "getter"), for example by circulating strong currents in the gas trap, to ensure the quality of the vacuum of the cryostat, etc.) and the need for equipment replacement, for example in the event of severe mechanical failure.

DESCRIPTION OF THE INVENTION

The invention proposes to remedy at least one of these drawbacks.

For this purpose, according to a first aspect, the invention relates to a predictive maintenance method for a cooled detection module, comprising:
- a detector comprising pixels that are sensitive to light signals;
- a cryostat, containing the detector; and
- a cooling machine, the method being characterised in that it comprises a step whereby a processing board of the module, which is electrically connected to the detector, to the cryostat and to the cooling machine, measures, stores and processes at least
- one motor current, i.e. a machine supply current;
- one motor voltage, i.e. a machine supply voltage; and
- a number of defective pixels of the detector.

According to the first aspect thereof, the invention advantageously further comprises the following features, alone or in any technically possible combination thereof:
- the board is further suitable for
  - measuring, storing and processing at least one mode change time, i.e. a time separating a module start time from a time when the machine switches to a detector temperature regulation mode; and
  - performing a step for comparing the mode change time MCT to a threshold $S_{MeF}$, and declaring the module defective when the following condition is true:

$MCT > S_{MeF}$

- the board performs a step for comparing:
  a) a mean motor current Imot_mean to a threshold Imot_min, and declares the module defective when the following condition is true:

Imot_mean < Imot_min, and b) a mean motor voltage Vmot_mean to a threshold Vmot_max, and declares the module defective when the following condition is true:

Vmot_mean > Vmot_max, and c) a number Ppix_def of defective pixels of the module to a maximum tolerated number Ppix_def_max, and declares the module defective when the following condition is true:

Ppix_def>Ppix_def_max.

the board is further suitable for measuring, storing and processing at least
a number NMM of start-ups of the module, i.e. a quantification of module starts; and
a number CCR of mode changes, i.e. transitions of the module from a cooling mode to a regulation mode
an operating time Tps of the module, i.e. the total time in regulation mode and/or in cooling mode of the module, from commissioning.
the board calculates a type of use of the module by means of the formula:

$$TU = \frac{x \cdot Tps}{y \cdot CCR + z \cdot NMM}$$

where x, y and z are parameters stored on the board;
the board calculates:
the rate of increase, as a function of time, of the motor current and motor voltage, and
a future fault of the module as a function of NMM, CCR and/or Tps.
the measurements are made regularly and in real-time by the board.

According to a second aspect, the invention relates to a cooled detection module for implementing the method, comprising:
a detector comprising pixels that are sensitive to light signals;
a cryostat, containing the detector; and
a cooling machine,
the module being characterised in that it further comprises a processing board, which is electrically connected to the detector, to the cryostat and to the cooling machine, the board being suitable for measuring, storing and processing at least
one motor current, i.e. a machine supply current;
one motor voltage, i.e. a machine supply voltage; and
a number of defective pixels of the detector.

The module may comprise a predictive maintenance display, connected to the board. Furthermore, it may form an IR module, with an IR type detector.

The invention offers numerous advantages.

It makes it possible to anticipate DM faults by means of continuous, real-time, measurement of the electric consumption characteristics (current and voltage) for the cryostat and for the CM, and a progression of the number of defective pixels of the detector.

The user no longer needs to fear the appearance of unexpected untimely faults associated with the natural ageing of the DM, in the context of specific use.

The user is notified in advance of the need for maintenance or replacement of the DM.

The user can anticipate the maintenance phases of the equipment and thus reduce equipment downtime.

By means of observation in regulated mode, the invention enables the detection of a type of fault that is undetectable by prior techniques and essentially consists of the case wherein the system is degraded such as following continuous operation over a long period of time (for example for continuous monitoring systems).

The combined observation of currents and voltages enables superior diagnosis of the fault, since it makes it possible to discriminate between the need for a preventive maintenance operation (such as pumping up the CM, gettering the cryostat, etc.) and the need to replace the equipment, for example in the case of a severe mechanical failure.

The type of use makes it possible to optimise preventive maintenance by accounting for the operating mode of the equipment. Subsequently, taking into consideration the type of use (use 24 hours a day and 7 days a week is thus different from use for one hour per day, for example) is a genuine advantage for evaluating the condition of the system, thus for defining the optimal preventive maintenance conditions.

DESCRIPTION OF THE FIGURES

Further features, aims and advantages of the invention will emerge from the description hereinafter, which is merely illustrative and not limiting and should be read with reference to the appended figures wherein.

DETAILED DESCRIPTION

Figure 1:
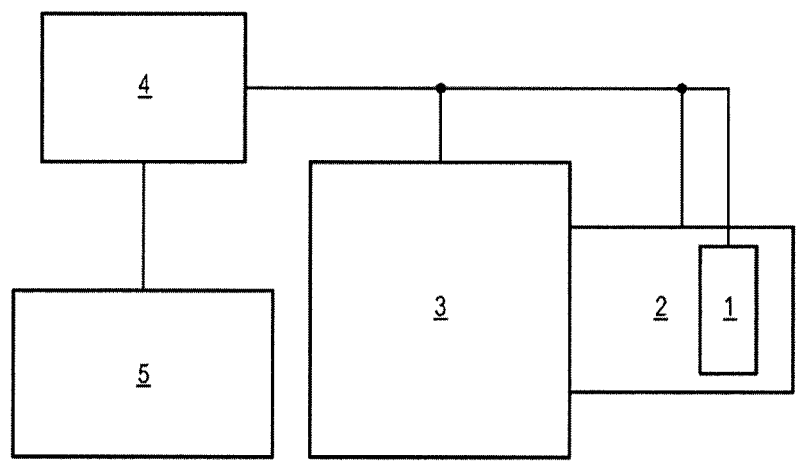
FIG. 1 represents a module according to the invention.

As shown in FIG. 1, a cooled CM according to the invention essentially comprises:
a detector 1, that is sensitive to light signals, consisting of an array of photosensitive pixels;
a cryostat 2, containing the detector 1 and used for mechanically conditioning the detector 1 and providing thermal insulation; and
an electromechanical cooling machine 3 (CM), used for lowering the temperature of the cryostat 2 locally, by means of repeated gas expansions.

The DM further comprises a processing board 4, comprising all the conventional memory and calculation means for implementing the invention.

The board 4 is also suitable for conventionally managing the control of the cooling machine 3 for the cooling and regulation described in the introductory section of the present description.

The board 4 is electrically connected to the detector 1, to the cryostat 2 and to the CM 3.

The board 4 is suitable for measuring, storing and processing at least
one motor current, i.e. a machine 3 supply current;
one motor voltage, i.e. a machine 3 supply voltage; and
a number of defective pixels of the detector 1.

Obviously, the number of defective pixels may be expressed as a percentage.

The motor current, the motor voltage and the number of defective pixels are measured very advantageously regularly (frequency in the region of one minute) and in real-time by the board 4.

The values corresponding to the measurements are stored on the board 4. Management, which is circular for example, of the memory of the board 4 prevents memory saturation, in the event of the memory only being suitable for storing some tens of values for example.

Based on the knowledge of the voltage, current parameters and the number of defective pixels, it is possible to inform the user of the type of fault (need for replacement or mere maintenance procedure) and, if applicable, the maintenance procedure to be conducted (pumping up, further gettering).

Sudden Fault Detection

Figure 4:
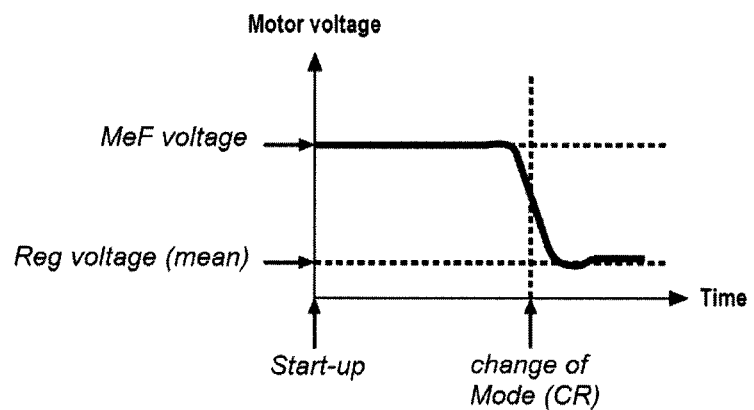
FIG. 4 represents the progression of the motor voltage as a function of time, following a mode change.
In all the figures, similar elements bear identical reference numbers.

As shown in FIG. 4, observing the progression of the motor current and the motor voltage helps detect a change of mode, i.e. the transition from the cooling mode C to the regulation mode Reg.

By means of the observation, which is advantageously regular and in real-time, of the motor current and the motor voltage, the board 4 can thus determine a change of mode CR, i.e. the time when the CM changes from MeF mode to Reg mode. Indeed, CR is equivalent to an inflection point on the motor current and motor voltage curves as a function of time.

The board 4 can thus define a Mode Change Time MCT, i.e. a time separating the CM start-up time from the time of CR.

The board 4 then performs a step for comparing the mode change time MCT to a threshold $S_{MeF}$, and declares the module defective when the following condition is true:

$$MCT > S_{MeF}$$

The board 4 can thus detect a sudden module fault during cooling, since the cooling MeF is too long over time.

The module comprises a predictive maintenance display 5, connected to the board 4. The display 5 is for example a liquid crystal type screen, optionally associated with an audio alarm, and takes the fault report from the board 4 to notify the use of the sudden fault in cooling mode.

The threshold $S_{MeF}$ is dependent on the optronic system wherein the module is implemented, and a MCT that is significantly lower than $S_{MeF}$ indicates a very close CM start-up time to the last cooling. This situation does not indicate a module anomaly.

The board 4 is also suitable for detecting a sudden fault in a Reg mode.

For this purpose, the board 4 performs a step for comparing a mean motor current Imot_mean to a threshold Imot_min.

Imot_mean is calculated on the basis of instantaneous current values during Reg mode. The frequency of the instantaneous measurements by the board 4, as for the number of measurements whereon the mean is calculated, may be adjusted in order to be adapted to the sought applications.

Figure 2A:
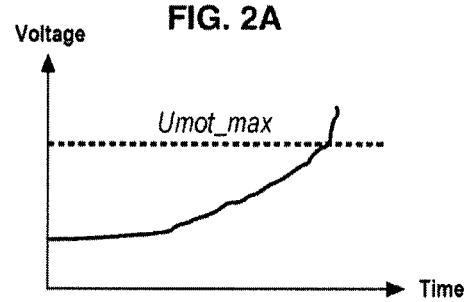
FIG. 2 represent the progression of the motor current and motor voltage of the CM, as a function of time.

As shown in FIG. 2A, Imot_min is the threshold below which the board 4 considers the mean current value to indicate a DM fault.

The board 4 declares the module defective when the following condition is true:

$$Imot\_mean < Imot\_min.$$

Indeed, an excessive reduction in the current indicates a gas leak which, while it may not be too penalising for maintaining the temperature set-point in regulated mode, will be a blocking point at the next restart (when the cryogenic capacity of the CM is too low).

As above, the display 5 takes the fault report from the board 4 to notify the use of the sudden fault in cooling mode.

The board 4 also performs a step for comparing a mean motor voltage Vmot_mean to a threshold Vmot_max.

Vmot_mean is calculated on the basis of voltage values during regulation mode. The frequency of the instantaneous measurements, as for the number of measurements whereon the mean is calculated, may be adjusted in order to be adapted to the sought applications.

Figure 2B:
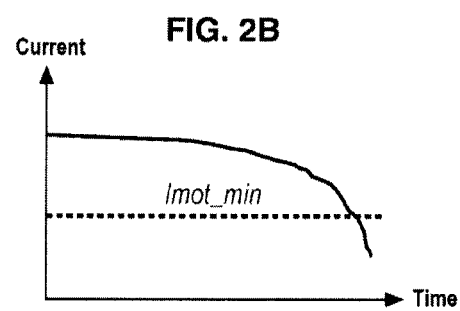

As shown in FIG. 2B, Vmot_max is the threshold above which the board 4 considers that the mean voltage value indicates a DM fault.

The board 4 declares the module defective when the following condition is true:

$$Vmot\_mean > Vmot\_max.$$

As seen hereinafter in the description, the combined observation of the behaviour in respect of motor voltage and motor current makes it possible to discriminate between a maintenance requirement and a need to replace the CM.

Figure 3:
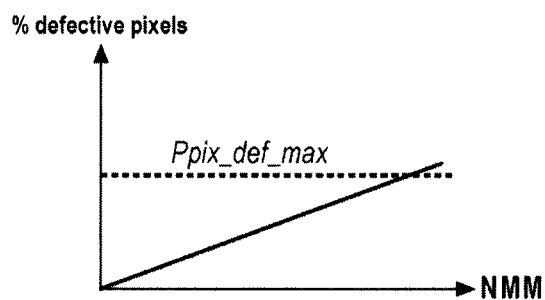
FIG. 3 represents the progression of the number of defective pixels as a function of the number of start-ups.

As shown in FIG. 3, the board 4 may also perform, additionally or alternatively, a step for comparing a number Ppix_def of defective pixels of the detector to a maximum tolerated number Ppix_def_max, and declares the module defective when the following condition is true:

$$Ppix\_def > Ppix\_def\_max.$$

It is thus possible to immediately determine the type of fault involved, i.e. whether is consists of a need to replace the module or merely a maintenance procedure.

For example, if it is observed that, for the same motor voltage, the required motor current is lower, this is typically due to helium leakage on the CM. Indeed, the motor current reflects the resistance of the cooling machine 3 to rotation, and if this motor current requirement decreases for the same speed required for the cooling machine 3 (i.e. the same motor voltage), this means that there is less gas than beforehand. In this case, it is advised to pump up the CM.

Slow Fault Detection

The board 4 is further suitable for, advantageously regularly and in real-time, measuring, storing and processing at least a number NMM of start-ups of the module, i.e. a quantification of module starts; and;

a number CCR of mode changes, i.e. transitions of the module from a cooling mode to a regulation mode; and an operating time Tps of the module, i.e. the total time in regulation mode and/or in cooling mode of the module, from commissioning.

The memory of the board 4 is thus designed for storing these additional data.

The board 4 can thus calculate a type of use TU of the module.

The type of use is for example a function of Tps, CCR and NMM.

For example, TU is advantageously determined by the formula:

$$TU = \frac{x \cdot Tps}{y \cdot CCR + z \cdot NMM}$$

where x, y and z are parameters stored on the board 4.

Further formulas are also possible, such as for example:

$$TU = \frac{x \cdot Tps + z \cdot NMM}{y \cdot CCR}$$

The choice of the parameters x, y and z makes it possible to adjust the respective importance of Tps, CCR and NMM on the service life of the DM.

The board 4 can also calculate the rate of increase PENTE, over time, of the mean motor current Imot_mean and the mean motor voltage Vmot_mean, between the times t and Δt according to the formula:

$$PENTE_I = \frac{\text{Imot\_mean}(t + \Delta t) - \text{Imot\_mean}(t)}{\Delta t}$$

$$PENTE_V = \frac{\text{Vmot\_mean}(t + \Delta t) - \text{Vmot\_mean}(t)}{\Delta t}$$

Similarly, the board 4 can evaluate the rate of increase of the number or percentage of defective pixels Ppix_def.

The time interval Δt where on the rate of increase is calculated may be:

either large (long-term trend of quantity observed)
or small (immediate trend of quantity).

Optionally, the board 4 may make a comparison between a long-term value and an immediate value, to support the prediction of a fault or not.

The above-mentioned calculations enable the board 4 to calculate a future fault of the module as a function of NMM, and/or CCR and/or Tps according to the user's choice.

Indeed, the projection of the rate of increase PENTE of the quantity observed (I, V or the percentage of defective pixels, for example) makes it possible to calculate the maximum number of hours after which a procedure on the DM is required, as shown in FIG. 2A for the current, FIG. 2B for the voltage, and FIG. 3 for the number of defective pixels.

The projection giving the lowest maximum number of hours in FIGS. 2 and 3 is obviously chosen.

The board 4 makes it possible to define the residual service life of the module, i.e. the remaining NMM, CR and/or Tps before a maintenance requirement arises.

Indeed, the maximum number of hours obtained makes it possible to determine the specific residual operating time $Tps_{RESIDUAL}$.

For example, at the time $Tps_0$ to determine the residual operating time in regulated mode using the projection of the motor voltage, the following formula would be used:

$$Tps_{RESIDUAL} = \frac{\text{Vmot\_max} - \text{Vmot\_mean}(Tps_0)}{PENTE_V} + 2 \times Tps_0$$

It is then easy to convert this information, according to the user's wishes, for example into the specific residual NMM $NMM_{RESIDUAL}$ using the formula:

$$NMM_{RESIDUAL} = \frac{Tps_{RESIDUAL}}{TU}$$

Thus, $CCR_{RESIDUAL}$ is also defined by:

$$CCR_{RESIDUAL} = \frac{CCR}{NMM} \times NMM_{RESIDUAL} \text{ if } \frac{CCR}{NMM} \geq k$$

$$CCR_{RESIDUAL} = NMM_{RESIDUAL} \text{ else}$$

The percentage k is a lower limit used to resolve specific early lifetime scenarios (when the values of CCR and NMM are low).

Optionally, TU makes it possible to weight $Tps_{RESIDUAL}$, $NMM_{RESIDUAL}$ or $CCR_{RESIDUAL}$ by including them in the calculation of the maximum number of hours after which a procedure on the DM is required.

Advantageously, the module described below is an IR (infrared) module, with an IR type detector.

The invention claimed is:

1. Predictive maintenance method for a cooled detection module, comprising:

a detector comprising pixels that are sensitive to light signals;
a cryostat, containing the detector; and
a cooling machine, the method comprising a step whereby a processing board of the module, which is electrically connected to the detector, to the cryostat and to the cooling machine, measures, stores and processes at least one motor current, including a machine supply current;
one motor voltage, including a machine supply voltage; and
a number of defective pixels of the detector;
wherein the method comprises using said motor current, said motor voltage and said number of defective pixels of the detector for determining a fault in the cooled detection module and informing a user of said fault in said cooled detection module if so determined, and wherein the board is for measuring, storing and processing at least a number NMM of start-ups of the module, including a quantification of module starts; and
a number CCR of mode changes, including transitions of the module from a cooling mode to a regulation mode, and
an operating time Tps of the module, including the total time in regulation mode and/or in cooling mode of the module, from commissioning.

2. Method according to claim 1, wherein the board (4) is further suitable for measuring, storing and processing at least one mode change time, i.e. a time separating a module start time from a time when the machine (3) switches to a detector (1) temperature regulation mode; and
performing a step for comparing the mode change time MCT to a threshold $S_{MeF}$, and declaring the module defective when the following condition is true:

MCT>$S_{MeF}$.

3. Method according to claim 1, wherein the board performs a step for comparing a) a mean motor current Imot_mean to a threshold Imot_min, and declares the module defective when the following condition is true:

Imot_mean<Imot_min, and b) a mean motor voltage Vmot_mean to a threshold Vmot_max, and declares the module defective when the following condition is true:

Vmot_mean>Vmot_max, and c) a number Ppix_def of defective pixels of the module to a maximum tolerated number Ppix_def_max, and declares the module defective when the following condition is true:

Ppix_def>Ppix_def_max.

4. Method according to claim 1, wherein the board calculates a type of use of the module by means of the formula:

$$TU = \frac{x \cdot Tps}{y \cdot CCR + z \cdot NMM}$$

where x, y and z are parameters stored on the board.

5. Method according to claim 1, wherein the board (1) calculates
- the rate of increase, as a function of time, of the motor current and motor voltage, and
- a future fault of the module as a function of NMM, CCR and/or Tps.

6. Method according to claim 1, the measurements are made regularly and in real-time by the board.

7. Cooled detection module, comprising:
- a detector comprising pixels that are sensitive to light signals;
- a cryostat, containing the detector; and
- a cooling machine, the module further comprising a processing board, which is electrically connected to the detector, to the cryostat and to the cooling machine, measures, stores and processes at least
- one motor current, including a machine supply current;
- one motor voltage, including a machine supply voltage; and
- a number of defective pixels of the detector wherein the processing board is configured to use said motor current, said motor voltage and said number of defective pixels of the detector for determining a fault in the cooled detection module and informing a user of said fault in said cooled detection module if so determined, and
wherein the board is configured to measure, store and process at least
- a number NMM of start-ups of the module, including a quantification of module starts; and
- a number CCR of mode changes, including transitions of the module from a cooling mode to a regulation mode, and
- an operating time Tps of the module, including the total time in regulation mode and/or in cooling mode of the module, from commissioning.

8. Module according to claim 7, comprising a predictive maintenance display, connected to the board.

9. Module according to any of claim 7 or 8, acting as an IR module, with an IR type detector.

\* \* \* \* \*